United States Patent [19]

Hampton et al.

[11] 4,106,030

[45] Aug. 8, 1978

[54] INK JET PRINTER INK HEATER

[75] Inventors: Perry Dwaine Hampton, Dallas; Jimmie Lee Tobey, Garland, both of Tex.

[73] Assignee: Recognition Equipment Incorporated, Dallas, Tex.

[21] Appl. No.: 768,518

[22] Filed: Feb. 14, 1977

[51] Int. Cl.[2] .......... G01D 15/18

[52] U.S. Cl. .......... 346/140 R; 219/302; 219/303; 219/305; 346/75

[58] Field of Search .......... 346/75, 140 R; 219/302, 219/303, 304, 305

[56] References Cited

U.S. PATENT DOCUMENTS

| | | | |
|---|---|---|---|
| 941,215 | 11/1909 | Wade | 219/303 |
| 1,560,528 | 11/1925 | Baum | 219/302 X |
| 3,790,033 | 2/1974 | Ciaffone | 219/302 X |
| 3,999,190 | 12/1976 | Brown | 346/140 R |
| 4,007,684 | 2/1977 | Takano | 346/140 R X |

OTHER PUBLICATIONS

Ruddy, G. A.; Viscosity Control Circuit; IBM Tech. Disc. Bulletin, vol. 16, No. 10, Mar. 1974.

*Primary Examiner*—Joseph W. Hartary

*Attorney, Agent, or Firm*—John E. Vandigriff; Thomas W. DeMond

[57] ABSTRACT

An ink temperature control apparatus having an enclosed heat conducting structure with ink circulating therein is provided in a ink jet printer. The temperature control apparatus includes a heating element attached to the structure and thermally engaged with the ink contained within the ink structure. A temperature sensing device is also located on the structure and is thermally engaged with the ink contained within the structure. A control system is provided to respond to the temperature sensing device and actuate the heating element in response to the temperature information communicated by the temperature sensing device. The ink is maintained at a certain predetermined temperature by the control system. Ink under pressure enters the structure from a sump after being pressurized by a pump. Subsequent to leaving the structure, the heated ink proceeds to a nozzle of the ink jet printer. Any ink exiting the nozzle which is not utilized for printing purposes is collected and returned to the sump to be recycled through the ink jet printer.

4 Claims, 8 Drawing Figures

768518

INK JET PRINTER INK HEATER

BACKGROUND OF THE INVENTION

1. Field of the Invention

The invention relates to a temperature control apparatus for an ink jet printer and, more particularly, to a temperature control apparatus which utilizes a heater for heating the pressurized ink in a ink jet printer utilizing an ink recycling system.

2. Brief Description of the Prior Art

Various ink jet printing systems are well known in the art. It has been considered desirable to recycle the unused or waste ink. However, a well known difficulty has risen in connection with recycling the ink. Because of the evaporation of the solvent of the ink during the transit of the ink between the nozzle, and the drain or gutter of the ink jet printer, the viscosity of the ink is subject to variation. The ink is exposed to the ambient air while in transit between the nozzle and the drain.

Ink jet printers have been developed for making a record on a writing medium by generating a series of ink drops, applying a charge successively on each of these ink drops in response to a received signal, and then directing these ink drops along a path between two parallel conductive plates. A bias potential is applied to these plates with the result that the ink drops are deflected so that when they reach the writing medium (or material upon which it is desired to write) they provide a representation of the information contained in the signals. The general configuration employed for ink drop printers consists of an ink sump which contains ink. The sump feeds a pump which in turn feeds a conduit which is connected to a nozzle. An electromechanical transducer is employed to vibrate the nozzle at some suitably high frequency which causes the ink to be ejected from the nozzle in a stream which shortly thereafter breaks into individual drops. It is desirable for proper charging of the individual drops that the breakup of the stream occurs within the charging slot which is the location along the path where the actual charging of each individual drop takes place.

It is well known in the art that the viscosity of the ink or writing fluid is one of the major parameters which determines the location along the path of the stream of ink where the breakup into individual drops occurs. A change in the viscosity of the ink or writing fluid will cause the point at which breakup occurs to change which in turn effects the charging of the ink drops in response to the signal. It is further well known that viscosity of fluids varies with temperature and, in the case of some inks and other fluids, extremely rapidly. The design parameters of ink jet printers generally allow for some variation in the viscosity of the fluid but with the addition of an ink recycling system it has been found to be desirable to gain greater control over the viscosity of the fluid by maintaining a stable temperature for the ink entering the nozzle. This temperature related phenomenon is observed where the characteristics of individual nozzles vary with the temperature of the operating environment. The greater variation in the viscosity experienced with ink recycling systems is due to evaporation of the solvent component of the ink (as discussed above). It is anticipated that other applications of the temperature control apparatus within the ink jet printer described herein will be found wherever there is a need to gain additional control over the viscosity of the ink or writing fluid being utilized in the system.

SUMMARY OF THE INVENTION

The invention shown and described herein is an ink temperature control apparatus utilized within an ink jet printer provided with an ink recycling system. Ink or any other writing fluid is drawn from a sump and pressurized by a pump. The pressurized ink proceeds through a series of filters, valves, and an accumulator until it reaches an ink reservoir structure. The ink reservoir structure is constructed of a heat conducting material and has an internal, closed cavity. The structure has two openings into the cavity in order that fluid may be circulated there through. The ink reservoir structure is provided with a plurality of concentric, circular flanges which extend across the cavity. Each flange has a slot, and the slots are arranged so that the slot of one flange is radially opposite or 180° from the slots of the flanges adjacent thereto. A first opening of the ink reservoir structure into the cavity is located between the outermost flange and the interior surface of the ink reservoir structure. The second opening of the ink reservoir structure is located within and is concentric to the innermost flange. The ink or writing fluid is circulated through the first opening around the outermost flange between that flange and the interior surface of the ink reservoir structure. The ink then passes through the slot in the outermost flange, and around the flange next inward between the outermost flange and that next inward flange. The ink then proceeds through the slot in the next inward flange and so on until it reaches the interior of the innermost flange where it proceeds out of the cavity through the second opening in the ink reservoir structure.

The ink then proceeds to the nozzle of the ink jet printer where the stream is modulated with a vibration issuing out of an orifice in the nozzle which causes the stream to break up into drops. The waste or unused drops are collected and returned to the sump to be recycled.

DESCRIPTION OF THE PREFERRED EMBODIMENT

The invention will first be discussed in relation to the temperature control apparatus. The temperature control apparatus will then be incorporated into an ink jet printer with a recycling system.

Figure 1:
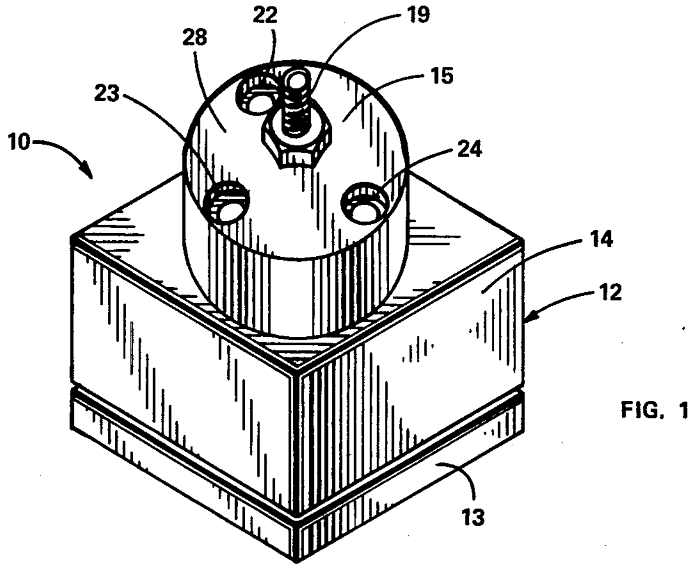
FIG. 1 is a view in perspective of a temperature control apparatus constructed according to the present invention.

A first embodiment (generally designated as 10) is shown in FIG. 1. An ink reservoir structure 12 is comprised of a dual path or maze block 13, and a rectangular capping block 14 which are constructed of a heat conductive material such as stainless steel.

Also shown in FIG. 1 is a filter housing 15. The filter housing 15 is cylindrical and has a fitting 19 located along its axis. The filter housing 15 is also provided with three alignment holes 22, 23 and 24 which are equiangularly distributed about the axis of the filter housing. The alignment holes extend through the filter housing parallel to the axis thereof. Further, the alignment holes are countersunk so that bolts placed therein will be flush with the upper (as shown in FIG. 1) surface 28 of the filter housing 15.

Figure 2:
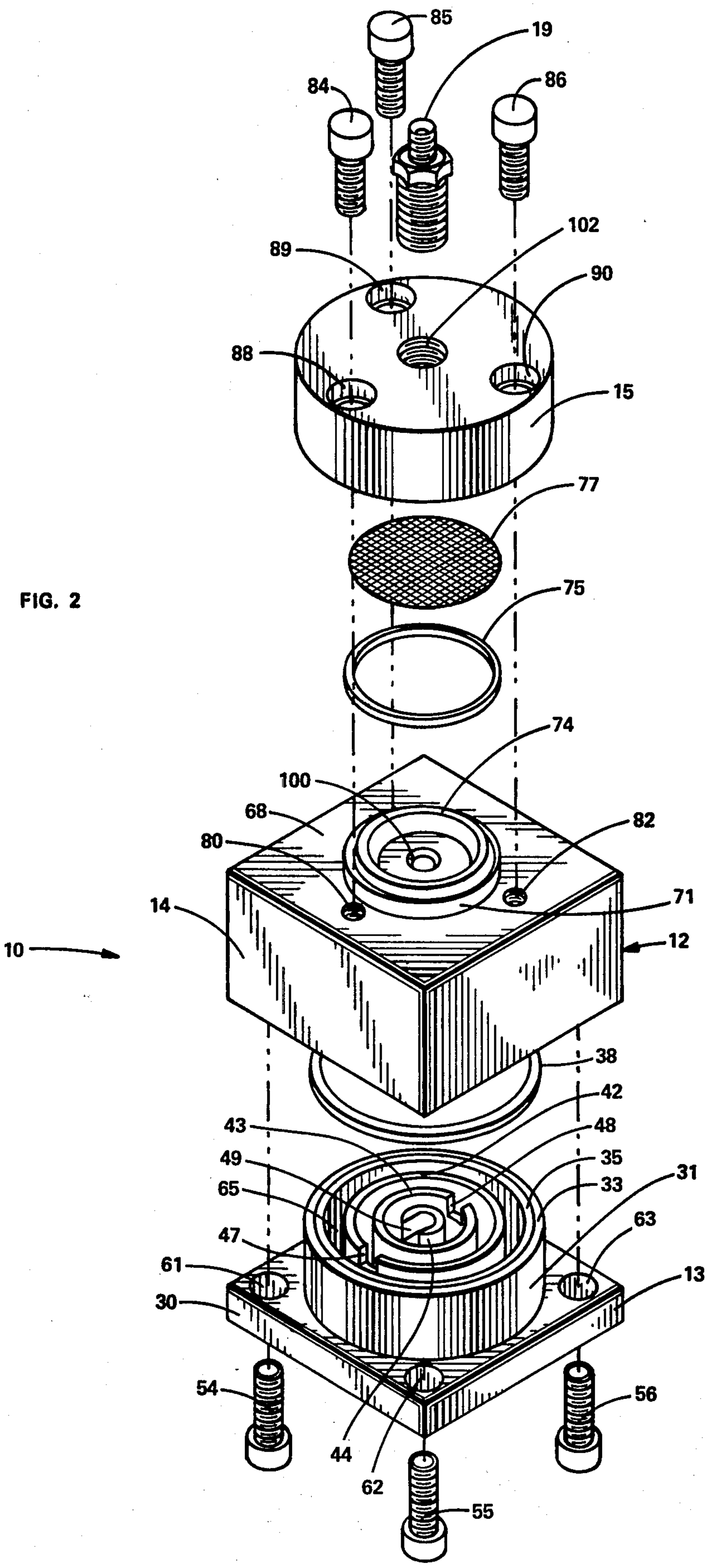
FIG. 2 is an exploded view of the temperature control apparatus which reveals portions concealed in the assemblied invention as shown in FIG. 1.

The embodiment 10, as shown in FIG. 2, has been exploded in order that the internal details of the ink reservoir structure 12 and the filter housing 15 are revealed. The dual path block 13 has a baseplate 30 which is rectangular in shape. A cylinder 31 extends upward (as shown in FIG. 2) from baseplate 30 and is a part thereof. The upper edge 33 of cylinder 31 away from the baseplate 30 has an axially extending rim 35. The edge 33 and rim 35 cooperate to allow o-ring 38 to be seated on edge 33 and around rim 35.

Also extending upward from baseplate 30 are flanges 42, 43, and 44. The flanges are circular and concentric both with respect to themselves and cylinder 31. Also, the flanges are spaced from each other and from cylinder 31. The spacing will allow ink to be circulated therein (to be discussed in detail hereinafter). Further the flanges are evenly spaced radially outward from the center of cylinder 31. Each of flanges 42, 43, and 44 is provided with an axially extending slot 47, 48, and 49, respectively. The flanges should be constructed of a thermally conductive material compatible with the material of the dual path and capping blocks. The flanges are of the same axially length and extend axially slightly further than the rim 35 of cylinder 31.

The capping block 14 has a cylindrically shaped opening (not shown) adapted to fit around cylinder 31. The opening or well in capping block 14 has a flat surface (not shown) at its bottom which is designed to engage the tops of flanges 42, 43 and 44. The capping block 14 also has four threaded holes (not shown) which are adapted to threadably received boths 54 through 57 which are passed through alignment holes (only three of which 61, 62, and 63 are shown) for tightening capping block 14 onto dual path block 13. O-ring 38 is compressed against the bottom of the opening in capping block 14 until metal to metal contact between the flanges and the bottom of the opening is obtained. Thus, a seal is formed by o-ring 38 which prevents any ink or writing fluid contained within the cavity formed by the bottom of the opening in capping block 14 and the interior surface 65 of cylinder 31 from leaking out over the edge 33 of cylinder 31.

FIG. 2 also shows filter housing 15 with its various parts exposed. A ring 71 extends outward from the upper surface 68 of capping block 14 which is away from the opening provided for cylinder 31. The ring 71 is provided with a nib 74 which is inward from the main portion of ring 71 and extends axially away from ring 71. The nib allows an o-ring 75 to be seated on ring 71 and around nib 74 for forming a seal in a manner similar to that formed by o-ring 38. Housing 15 is provided with an opening (not shown) which is adapted to fit over ring 71 and which will compress o-ring 75 to provide the seal. Also contained in housing 15 is a filter screen 77. The purpose of filter screen 77 is that of a standard filter screen which is to remove clots or other undesirable material from the fluid flowing through. Three threaded holes (only two of which are shown) 80 and 82 are adapted to threadably receive bolts 84 through 86 which are passed through alignment holes 88 through 90, respectively, for tightening capping block 14 and housing 15 together.

Figure 3:
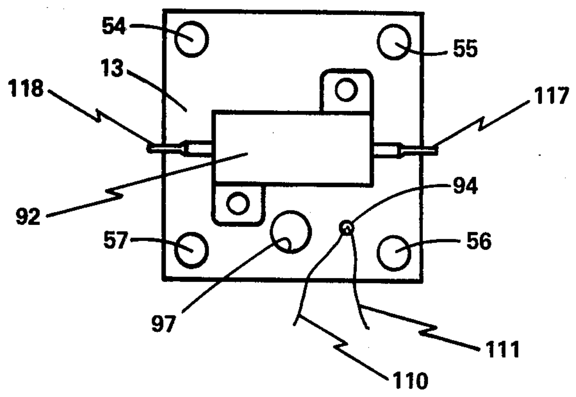
FIG. 3 is a bottom view of the temperature control apparatus shown in FIG. 1.

Another view of dual path block 13 is shown in FIG. 3. The four bolts 54 through 57 are shown in place within their respective alignment holes on the side of dual path block 13 away from cylinder 31. A heater, heating element, or resistor 92 is shown attached to dual path block 13. This heating element or resistor 92 is of conventional design as is the thermistor or temperature sensing device 94 which is also attached to dual path block 13. An opening 97 is also provided in the dual path block 13. The opening 97 is located so that fluid introduced into the cavity in ink reservoir structure 12 will be introduced into that cavity between the interior surface 65 (FIG. 2) of cylinder 31 and outermost flange 42 at 180° away from slot 47 of flange 42. Ordinarily a fitting (not shown) would be provided and affixed within opening 97. The fluid introduced into opening 97 will exit through an opening 100 in capping block 14 (FIG. 2). Writing fluid or ink will then pass through filter screen 77 and exit through an opening 102 in filter housing 15. It is desirable to affix a fitting 19 into hole 102 by some standard method, for example, by providing threads in opening 102 and threadably placing the fitting 19 therein.

The thermistor 94 communicates temperature information concerning the dual path block 13 and, therefore, information concerning the temperature of the ink contained within ink reservoir structure 12. Put another way, thermistor 94 is thermally engaged with the ink within the ink reservoir structure to provide a control system 114 (FIG. 8) with information concerning the temperature of the fluid. The heater 92 is also thermally engaged with the ink and when actuated will heat the ink. It is desirable to locate the thermistor 94 some distance from heater 92 unless appropriate adjustments are made due to the proximity of the two. Put another way, the thermistor 94 should be thermally remote from the heater 92.

Figure 4:
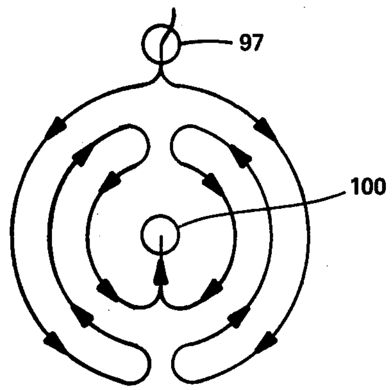
FIG. 4 is a flow diagram of the path which the ink will follow through the temperature control apparatus of FIG. 1.

The flow of ink through ink reservoir structure 12 will be discussed with reference to FIGS. 2 and 4. The ink is introduced through opening 97 and then proceeds to divide forming two streams or paths which will flow about outermost flange 42 through slot 47 then in both directions about intermediate flange 43 to its slot 48. The ink flows through slot 48, around flange 44 in both directions, proceed through its slot 49, and exit through opening 100 in capping block 14. The various arrows in FIG. 4 indicate the direction of flow. The flanges and the channeling of the flow will provide a large boundary area between the ink reservoir structure (with its flanges) and the ink. In other words, the flanges serve the function of a radiator.

Figure 8:
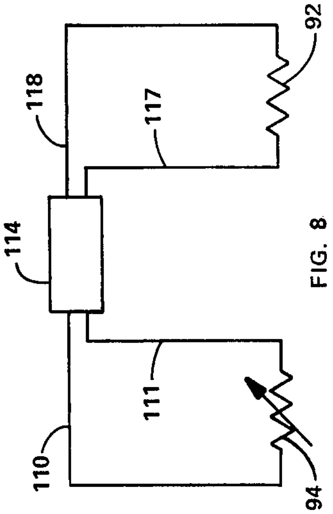
FIG. 8 is a schematic diagram of a control system and associated elements.

Thermistor 94 is connected through leads 110 and 111 to a control system 114 (FIG. 8). Heating element or resistor 92 (FIG. 8) is also connected to control system 114 through a pair of leads, 117 and 118. The control system responds to the temperature information provided by thermistor 94 and actuates resistor or heating element 92 to apply heat to the ink reservoir structure 12. The thermistor 94 could be located within the ink flow itself as could resistor 92, if properly insulated.

In operation, the output of thermistor 94 is communicated to control system 114 (FIG. 8). When thermistor 94 indicates a temperature below the desired set predetermined temperature for the ink, heating element or resistor 92 which is connected to the control system is actuated by supplying power thereto for applying heat to the ink through dual path block 13. The heater 92 is thermally engaged with the ink through the dual path block 13 of ink reservoir structure 12. In other words, the control system responds to the temperature information provided by the temperature control device by actuating the heating element to heat the ink.

Prior to a full discussion of the ink jet printer 125 shown in FIG. 7, two modifications of the temperature control apparatus 10 shown in FIGS. 1, 2, 3, and 4 will be discussed.

Figure 5:
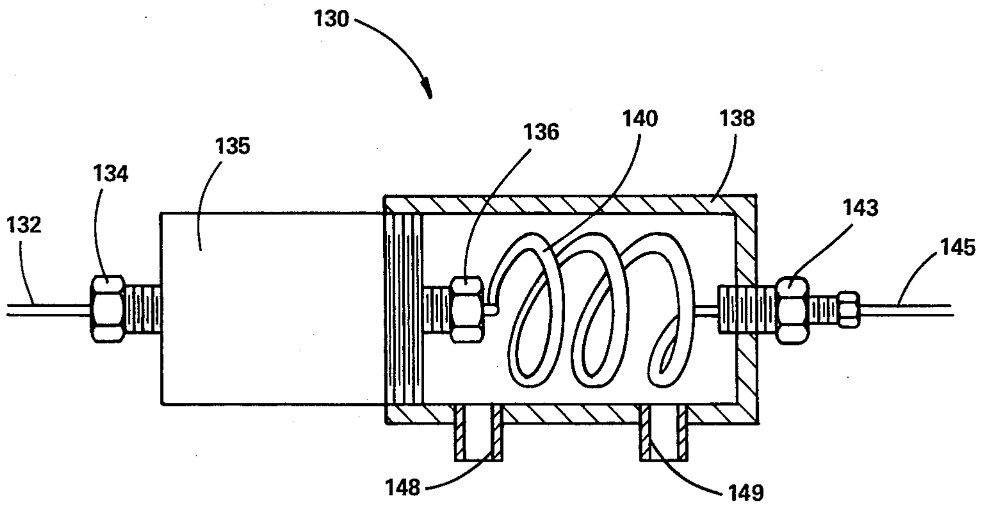
FIG. 5 is a longitudinal cross-sectional view of a second embodiment of the temperature control apparatus shown in FIG. 1.

The second embodiment 130 shown in FIG. 5 has a conduit 132 which is affixed into the fitting 134 of a filter 135. The ink or fluid passes from conduit 132 through filter 135 and finally through a fitting 136 within the embodiment 130. A cylindrical structure 138 of embodiment 130 contains a thermally conducting liquid. A spirally wound conduit 140 is immersed in the thermally conducting liquid. This conduit serves the same function as the cavity in ink reservoir structure that is the location of the heating of the ink. The ink passes from fitting 136 into conduit 140 and is heated by the thermally conducting liquid in structure 138. The ink exits through a fitting 143 and then continues into a conduit 145 where it proceeds to the nozzle of the ink jet printer. An appropriately position thermistor (not shown) may be located within one of the fittings or conduit 140 or within the structure 138 for providing temperature information concerning the temperature of either the ink or the thermally conducting liquid. The thermally conducting liquid will be circulated through structure 138 by entering through opening 148 and exiting through opening 149. A heater and pump (not shown) would be provided to maintain the temperature of the thermally conducted liquid at the desired level and circulate the liquid through structure 138. This heater would be actuated by the control system 114 to maintain the desired predetermined temperature of the ink.

Figure 6:
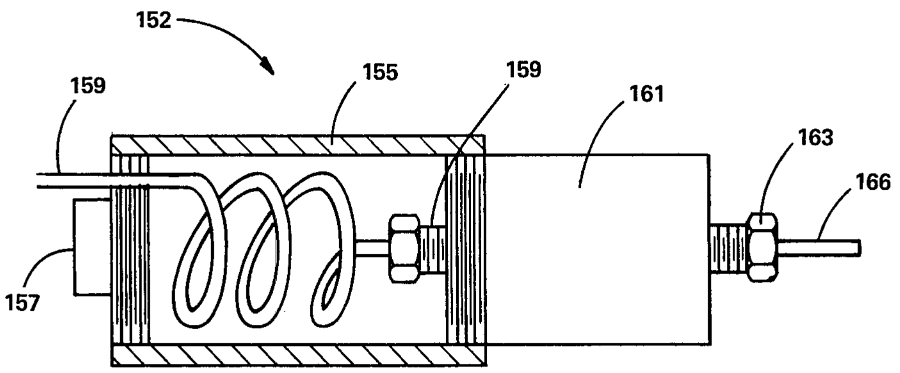
FIG. 6 is a longitudinal cross-sectional view of a third embodiment of the temperature control apparatus shown in FIG. 1.

A third embodiment 152 of the temperature control apparatus is shown in FIG. 6. A structure 155 has a heater 157 attached at one end. Ink or other writing fluid enters structure 155 through conduit 159 which is spirally wound within cylindrical structure 155. The ink exits through fitting 159 and enters a filter 161 where it is filtered. A fitting 163 is provided to connect filter 161 with conduit 166 through which the ink proceeds to the nozzle of the ink jet printing system. Conduit 159 serves a function identical to that of conduit 140 of FIG. 5. The interior of structure 155 is filled with a thermally conductive liquid. The thermistor or similar temperature sensing device (not shown) would be placed at an appropriate location on structure 155 or within the thermally conductive liquid or within conduit 159. The thermistor would provide temperature information to the control system 114 which would in turn actuate heater 157 to maintain the ink circulating through structure 155 at a certain predetermined temperature.

Figure 7:
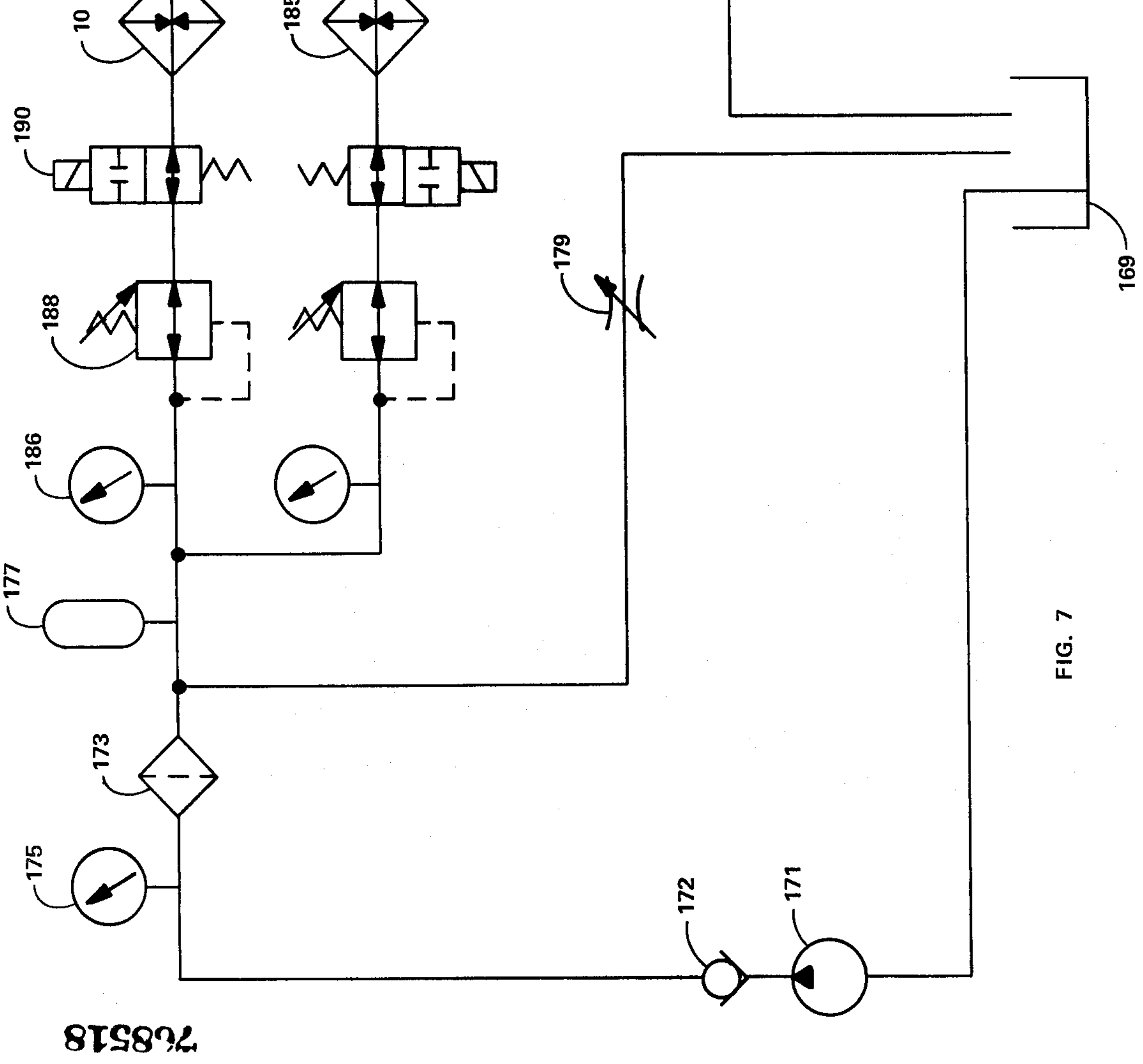
FIG. 7 is a block diagram of an ink jet printer provided with a recycle system and utilizing a temperature control apparatus.

The diagram of an ink, jet printer 125 shown in FIG. 7 is of essentially standard design as well known in the art; however, it has been provided with a temperature control apparatus and a recycling system. Ink is drawn from an ink sump 169 by a pump 171. A check valve 172 is provided at the output of pump 171 to prevent the ink from flowing from the remainder of the system back through pump 171. Pump 171 pressurizes the ink and the ink after passing through check valve 172 is filtered by filter 173. Pressure gauge 175, which is located between check valve 172 and filter 173, monitors the pressure of the ink leaving pump 171. After passing through filter 173, the ink goes to accumulator 177 and to a metering valve 179. Metering valve 179 is adjustable to allow a certain pressure to be set. If the set pressure is exceeded, valve 179 will open and allow the ink to pass through and return to the ink sump 169. This will lower the pressure in the remainder of the system to the pressure to which metering valve 179 has been set.

The output of accumulator 177 can be branched to two ink jet nozzles 183 and 184 or to only one nozzle or to any number of nozzles as desired. As both the paths (as shown in FIG. 7) operate similarly only the path leading to nozzle 183 need be discussed in detail. Further, the ink temperature control apparatus 10 of FIG. 1 is shown located in the path to nozzle 183. The temperature control apparatus could alternately be either modification 130 or 152 as shown in FIGS. 5 and 6, respectively. A similar ink temperature control apparatus 185 is provided in the path to nozzle 184.

A pressure gauge 186 is provided to monitor the pressure of the path to nozzle 183. A regulator valve 188 allows adjustment of the pressure in the remaining parts of the path. The output of regulator valve 188 passes through solenoid valve 190 and enters temperature control device 10 where it is heated if necessary (as discussed above). The solenoid valve serves as an on-off switch and is shown in the on or open position. The output of temperature control apparatus 10 is filtered by filter 192 prior to its arrival at nozzle 183. In order for the temperature control apparatus to be effective, it is necessary that the temperature of the ink prior to its introduction into the temperature control apparatus be less than the desired temperature. This may be accomplished by any number of methods, for example, by cooling the ink while it is in the ink sump 169.

The basic concept of an ink jet printer is that of imparting different charges to successive ink drops formed from a continuous stream to permit disposition of these drops onto a recording medium in a contiguous manner. As the ink leaves the orifice of the nozzle 183, the stream inherently breaks up into drops a short distance from the nozzle due to the natural instability of a fluid stream. In order to control the breakup of the stream a vibration is introduced into the fluid at the vicinity of the orifice of the nozzle. The vibration will result in the production of uniform drops with a fairly uniform break off point. Adjacent the stream at the vicinity where the drops break off is a charging slot (not shown) which may be of any suitable geometric configuration. A received signal is applied as a potential to the charging slot at the location of the drop formation. The field generated thereby induces a charge on the surface of the continuous ink stream. The charge on any portion of the ink stream is proportional to the electric field present at that surface which in turn is proportional to the voltage to present on the charging slot. In particular as a drop breaks away from the end of the stream, the charge on its surface is proportional to the voltage applied to the charging slot. After the drop has separated, its charge can no longer change, since it is now electrically insulated by the surrounding air. The charge on the individual drop is nearly proportional to the voltage applied to the charging slot at the time the drop breaks away from the stream.

A pair of electrically charged deflections plates (not shown) establishes a field which serves to differentially deploy the ink drops, which are differentially charged, while they are in transit toward a writing medium. As can be appreciated, the received signal must be accurately produced and transferred so that each drop strikes the recording medium in a position on its surface which is a function of the signal and therefore, the charge on the drop. It can also be appreciated that the break off points must be fairly uniform so that the drops will be properly charged. A change in the viscosity of the ink will alter the location of the break off point.

The charge of those drops not subject to the signal is not critical so long as it is sufficient to cause the droplets to be intercepted by drains or gutters 195 and 196. Drain 195 receives the waste or unused drops from nozzle 183, and drain 196 performs the same function for nozzle 184. The ink collected by drains 195 and 196 flows through filter 199 and into ink sump 169.

In operation, ink is drawn from reservoir 169 and pressurized by pump 171. The ink is then heated by an ink temperature control device and exits a nozzle. Finally, the ink is collected in a drain and returned back to the ink sump 169. Because evaporation of the solvent in the electrically conductive fluid or ink will occur while the ink is in transit from a nozzle to a drain, the viscosity of the fluid will be altered. A temperature control device has been introduced into the ink jet printer 125 so that control one of the parameters of viscosity, temperature, may be closely controlled. This will partially compensate for the variation in viscosity due to the evaporation.

Having described the invention in connection with certain specific embodiments thereof, it is to be understood that further modifications may now suggest themselves to those skilled in the art. It is intended to cover all such modifications as fall in the scope of the appended claims.

What is claimed is:

1. A fluid temperature control apparatus for an ink jet printer comprising:

a. a structure enclosing a cavity;
b. fluid under pressure circulating into and out of said cavity;
c. a heating element thermally engaged with said fluid within said structure for selectively applying heat to said fluid;
d. a temperature sensing device thermally engaged with said fluid within said structure; and
e. control means responsive to said temperature sensing device at a certain predetermined temperature and connected to said heating element for actuating said heating element to maintain said predetermined temperature, and wherein said structure includes a plurality of circular and concentric flanges extending across said cavity, each flange being provided with a slot to allow said fluid to pass there through, the slot of one flange being located radially opposite of slots of said flanges adjacent thereto.

2. An ink temperature control apparatus for an ink jet printer comprising an enclosed heat conducting ink reservoir structure having ink circulating there through, a heating element attached to said reservoir structure for selectively applying heat to said reservoir structure to head said ink, a temperature sensing device located on said reservoir structure for detecting the temperature of said ink, control means connected to said heating element for actuating said heating element, said control means being in communication with and responsive to said temperature sensing device for actuating said heating element at a certain predetermined temperature to maintain said ink at said predetermined temperature, and wherein said temperature control device is a thermistor, said ink reservoir structure including a cavity with said ink circulating there through and a plurality of circular concentric flanges extending across said cavity of said ink reservoir structure, each flange being provided with a slot to pass said ink there through, the slot of one flange being located radially opposite of slots of other adjacent flanges.

3. An ink temperature control apparatus for an ink jet printer comprising:

a. an ink reservoir structure enclosing a cavity and being provided with a first and second openings;
b. ink under pressure entering said ink reservoir structure through said first opening and exiting through said second opening after circulating through said ink reservoir structure;
c. a heater attached to said ink reservoir structure and adapted to selectively heat said ink;
d. a temperature sensing device located on said ink reservoir structure; and
e. a control means in communication with said temperature sensing device and connected to said heater for actuating said heater in response to said temperature sensing device, said control means being adapted to respond to said temperature sensing device at a certain predetermined temperature, and wherein said ink reservoir structure includes a plurality of circular concentric flanges extending across said cavity of said ink reservoir structure, each flange being provided with a slot allowing said ink to pass there through, the slot of each flange being located radially opposite of slots of adjacent flanges for providing a large boundary area between said ink and said ink reservoir structure, said plurality of flanges including an innermost and an outermost flange, said first opening being located outward of and adjacent to said outermost flange radially opposite from the slot of said outermost flange, and said second opening is concentric with and located within said innermost flange for circulating said ink throughout said ink reservoir structure.

4. An ink recycling system for an ink jet printer having a pump pressurizing ink from an ink sump and returning waste ink unused in a printing operation to said ink sump, said waste ink being collected in a drain after transiting from a nozzle of said printer to said drain, comprising:

a. a structure with ink under pressure circulating there through from said pump to said nozzle,
b. a heating element attached to said structure for selectively applying heat to said ink;

c. a temperature sensing device located on said structure for determining the temperature of said ink; and d. control means connected to said heating element for actuating said heating element, said control means being in communication with and responsive to said temperature sensing device to actuate said heating element at a certain predetermined temperature, and wherein said structure includes a plurality of circular concentric flanges extending across a cavity within said structure, each flange being provided with a slot to allow ink to pass there through, the slot of one flange being located radially opposite of slots of adjacent flanges.

* * * * *